3,500,616
ADSORBENT FOR GAS-SOLID CHROMATOGRAPHY

Clayton J. Bossart, Monroeville, Pa., assignor to Mine Safety Appliances Company, Pittsburgh, Pa., a corporation of Pennsylvania
No Drawing. Filed May 8, 1968, Ser. No. 727,663
Int. Cl. B01d 53/30
U.S. Cl. 55—386                                    13 Claims

ABSTRACT OF THE DISCLOSURE

A porous inert support is impregnated with a hydrolyzable beta (3,4 epoxy cyclohexyl) ethyl trisubstituted silane. The impregnated carrier is treated with warm moist air to effect hydrolysis of the silane followed by heat stripping a substantial portion of residual organic material from the hydrolysis product. The product is a packing for gas-solid chromatography of especial utility for separating the constituents of gas mixtures.

---

Chromatographic resolution of mixtures of gases into their constituents is well known, and a variety of adsorbents are available and used for that purpose. Some adsorbents are useful only for the separation of specific gases, or for the separation of only a limited number of individual gases. Other adsorbents are not adapted to be purged from such contaminants as high boiling materials to prepare them for reuse.

It is among the objects of this invention to provide a packing material and an apparatus for gas-solid chromatography that is useful for the resolution not only of simple mixtures but also is especially adapted to the resolution of mixtures of a plurality of gases, and which is adapted to be purged of high boiling materials to prepare the adsorbent for further chromatographic use.

Another object is to provide a method of preparing adsorbents in accordance with the foregoing object, which is easily practiced with readily available materials and readily available and uncomplicated apparatus.

In accordance with the invention a chemically inert inorganic support material is impregnated with a beta (3,4 epoxy cyclohexyl) ethyl trisubstituted silane, and the impregnated support is packed in a tube of inert material, such as glass to provide an apparatus for performing chromatographic separations. For this purpose the carrier is preferably porous, and preferably also it is siliceous. In the preferred embodiment there is used firebrick of 80/100 mesh size as the support, although as will be understood by those familiar with chromatographic practice, the particle size may vary according to the exact material and the particular purpose for which it is to be used.

The adsorbent capacity will depend, as those familiar with the art will recognize, upon the support material and also upon the relative amounts of the support as well as the particular silane. For many purposes the silane may constitute from 20 to 40 weight percent of the adsorbent. For example, using firebrick of the particle size just stated a preferred absorbent is made from forty grams of the liquid silane to sixty grams of the support. The silane may be applied in an inert volatile solvent.

When the silane is applied in an inert volatile solvent, such as petroleum ether, the solvent is removed at room temperature from the impregnated support. Thereafter warm moist air preferably saturated with water vapor at a temperature that does not strip the silane from the support, suitably by passing the air through the support at about 50° to 75° C., while agitating the material thoroughly to hydrolyze the silane and bond the hydrolysis product to the support. In the case of the silane stated this will result in evolution of methanol, and when the evolution has terminated, the packing is purged with an inert gas, such as nitrogen or helium, at a temperature of about 375° C. to strip at least a substantial proportion of the organic radical of the silane residue bonded to the support.

The hydrolysis of a trialkoxy silane does not lead merely to the triol of the silane, or to a single siloxane; on the contrary, the tendency is for the hydrolysis to produce a complex mixture of products which may be, and commonly are, both of straight chain and cross-linked structure, and similar considerations apply to other trisubstituted silanes. In the present instance, the presence of the epoxy group further complicates the hydrolysis as well as the constitution of the stripped material. Accordingly, the exact structure and amount of the stripped residue can not be stated but the fact is that it functions in the resolution of mixtures of gasses.

Adsorbents made in this way have been shown to be useful in the resolution of both simple and complex gas mixtures. For example, using helium as the carrier gas the order of retention of light gases has been found to be: hydrogen, nitrogen, oxygen, argon, carbon monoxide, nitric oxide, methane, carbon dioxide, nitrous oxide, ethylene, acetylene, ethane, carbonyl sulfide, propylene and propane, thus differing from commonly known adsorbents. The peak shapes obtained with the use of adsorbents in accordance with the invention are similar to those obtained with other adsorbent type packings.

The applicability and utility of the invention will be understood from the following examples.

EXAMPLE I

A 22 ft. x .085 inch I.D. column was prepared from 100/120 mesh firebrick which had been impregnated with 30 weight percent of beta (3,4 epoxy cyclohexyl) ethyl trimethoxy silane and treated as described above. Helium carrier gas at a flow rate adjusted to 25 milliliters per minute and the column temperature was set to 64° C. A gas sample of 0.35 milliliter was injected into the column. Detection was by means of thermal conductivity. The following retention times were noted:

| Component | Elution time, minutes |
|---|---|
| Air | 2.60 |
| Methane | 2.80 |
| Carbon dioxide | 3.23 |
| Nitrous oxide | 3.36 |
| Acetylene | 3.73 |
| Ethane | 3.97 |
| Carbonyl sulfide | 6.37 |
| Propylene | 7.81 |
| Propane | 8.40 |
| Cyclopropane | 9.75 |
| Isobutane | 21.5 |
| Normal butane | 27.6 |

It should be obvious that this column is an excellent choice for analysis of natural gas streams.

EXAMPLE II

A 22 ft. x .085 inch I.D. column was prepared from 80/100 mesh Chromosorb G®, a commercially available silicon dioxide support designed specifically for gas chromatography, which had been impregnated with 10% by weight beta (3,4 epoxy cyclohexyl) ethyl trimethoxy silane and treated as described. Helium flow rate was set at 23 milliliters per minute and the column temperature set to 77° C. The following retention times were noted:

® Registered trademark, Johns-Manville Corp.

| Component | Elution time, minutes |
|---|---|
| Air | 2.36 |
| Methane | 2.41 |
| Carbon dioxide | 2.53 |
| Ethane | 2.69 |
| Carbonyl sulfide | 3.47 |
| Propylene | 3.83 |
| Propane | 4.07 |
| Cyclopropane | 4.40 |
| Isobutane | 7.47 |
| Normal butane | 8.95 |
| 2,2 dimethylpropane | 15.5 |
| Isopentane | 20.3 |
| Normal pentane | 25.3 |

EXAMPLE III

This material is capable of performing the very difficult separation of nitric oxide from other gases. Forty percent beta (3,4 epoxy cyclohexyl) ethyl trimethoxy silane was impregnated on 80/100 mesh firebrick. A 16 ft. x .085 inch I.D. column was prepared at a helium flow of 23 milliliters per minute and 23° C., the following separation was noted:

| Component | Elution time, minutes |
|---|---|
| Nitrogen | 1.61 |
| Nitric oxide | 1.80 |
| Methane | 2.28 |

In addition to the utility of my new adsorbents for the resolution of gas mixtures, and particularly complex gas mixtures they are also suited to some purposes for which other adsorbents are not suited. For example, in some gas-solid separations the adsorbent picks up high boiling materials which unless removed would render the adsorbent unfit for further use. On the other hand some adsorbents, such as those made from polyaromatic compositions, can not be reconditioned at such temperatures. My new adsorbents can be conditioned for reuse by heating as high as about 400° C. to remove the undesired high boiling materials without substantial detriment to the action of the adsorbents.

Although the invention has been exemplified with reference to beta (3,4 epoxy cyclohexyl) ethyl trimethoxy silane, it will be understood that it is applicable equally to other hydrolyzable trisubstituted silanes such, for example, as beta (3,4 epoxy cyclohexyl) ethyl trihalo, triaroxy, triacetoxy, etc. silanes.

I claim:

1. The method of making an adsorbent for gas-solid chromatography comprising the steps of impregnating a chemically inert support material with a hydrolyzable beta (3,4 epoxy cyclohexyl) ethyl trisubstituted silane, agitating and contacting the impregnated material with heated moist air, and then purging the material with an inert gas at a temperature to strip at least a portion of the organic radical of the silane residue.

2. A method according to claim 1, the purging temperature being about 375° C.

3. A method according to claim 1, said support being porous and inorganic.

4. A method according to claim 3, said support being siliceous.

5. A method according to claim 1, said silane being applied in solution in an inert solvent.

6. A method according to claim 1, said silane being the trimethoxy compound.

7. An adsorbent for gas-solid chromatography comprising an inert support having bonded thereto a hydrolysis product of a beta (3,4 epoxy cyclohexyl) ethyl trisubstituted silane heated to about 375° C.

8. An adsorbent according to claim 7, said silane being the trimethoxy silane.

9. An adsorbent for gas-solid chromatography in accordance with claim 7, said support being porous and inorganic.

10. An adsorbent according to claim 9, the support being siliceous.

11. Apparatus for gas-solid chromatography comprising a tubular member of inert material having disposed therein a body of inert porous material impregnated with a hydrolysis product of a beta (3,4 epoxy cyclohexyl) ethyl trisubstituted silane.

12. Apparatus according to claim 11, said silane being the trimethoxy compound.

13. Apparatus according to claim 11, the hydrolysis product being the residue of heating it to about 375° C.

References Cited

UNITED STATES PATENTS

| 3,263,401 | 8/1966 | Supina | 55—67 |
| 3,116,161 | 12/1963 | Purnell | 55—67 X |

JAMES L. DECESARE, Primary Examiner